L. M. STELLMANN.
JOINT FOR VEHICLE SPRINGS.
APPLICATION FILED AUG. 20, 1920.
1,431,991.
Patented Oct. 17, 1922.
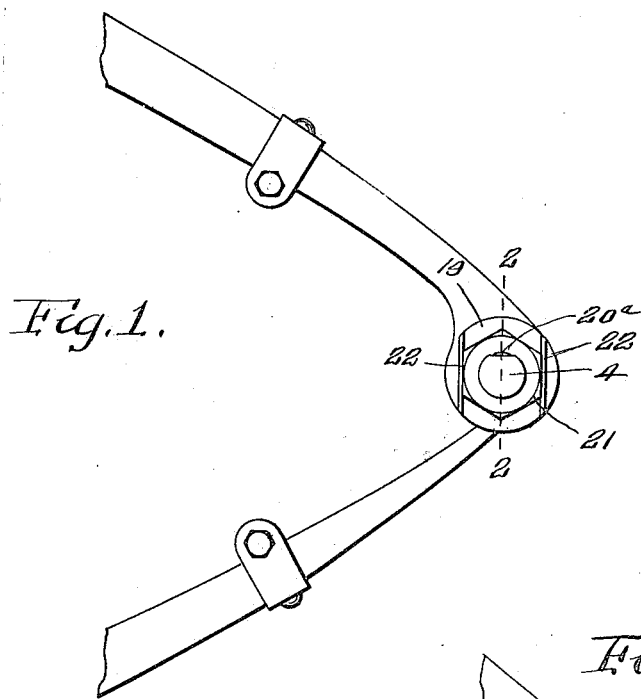
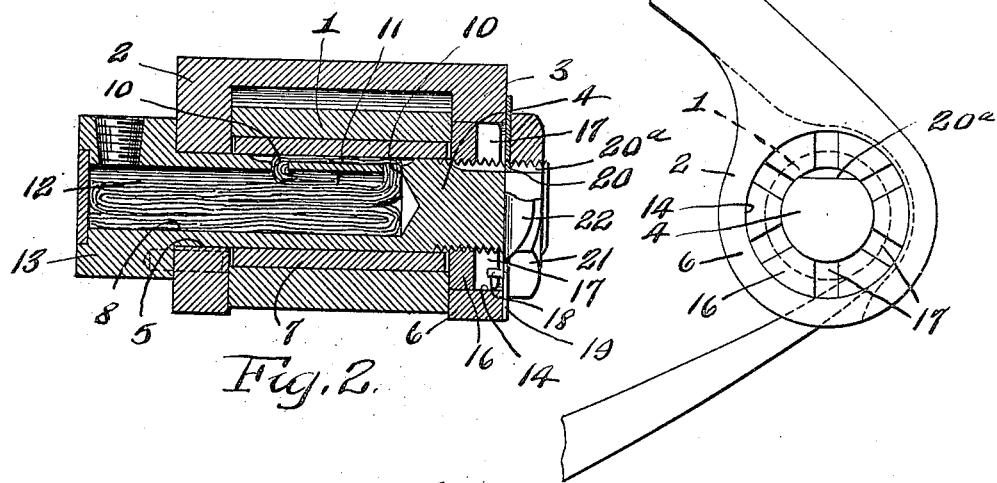
Louis M. Stellmann, INVENTOR.
BY Parsons & Bodell, ATTORNEYS.

Patented Oct. 17, 1922.

1,431,991

UNITED STATES PATENT OFFICE.

LOUIS M. STELLMANN, OF SYRACUSE, NEW YORK, ASSIGNOR TO H. H. FRANKLIN MFG. COMPANY, OF SYRACUSE, NEW YORK, A CORPORATION OF NEW YORK.

JOINT FOR VEHICLE SPRINGS.

Application filed August 20, 1920. Serial No. 404,744.

*To all whom it may concern:*

Be it known that I, LOUIS M. STELLMANN, a citizen of the United States, and a resident of Syracuse, in the county of Onondaga and State of New York, have invented a certain new and useful Joint for Vehicle Springs, of which the following is a specification.

This invention relates to joints for vehicle springs that is, joints including spring bolts connecting the ends of two semi-elliptical springs in full elliptical spring construction, the end of a leaf spring and a shackle or the end of such spring and a bracket, and it has for its object a particularly simple, efficient and durable means of taking up wear or thrust between the two parts connected by the spring bolt. The invention consists in the novel features and in the combinations and constructions hereinafter set forth and claimed.

In describing this invention, reference is had to the accompanying drawings in which like characters designate corresponding parts in all the views.

Figure 1 is a fragmentary view of the ends of two semi-elliptical springs of a full elliptical spring construction embodying this invention.

Figure 2 is an enlarged sectional view on line 2—2, Fig. 1.

Figure 3 is a face view of the thrust, take-up part or nut, and contiguous parts.

This vehicle spring joint comprises, generally, a member as a spring or spring leaf formed with an eye, an element as another spring leaf, shackle or a bracket formed with a yoke, the arms of which lap the ends of the eye, these arms being formed with openings or bearings alined with the eye, and a bolt element extending through the alined bearings and the eye, the bearing of one yoke arm substantially fitting or being journaled or pivotally mounted, on the bolt adjacent the head thereof, and the bearing of the other yoke arm being of greater diameter than the bolt providing an annular space around the bolt through which one end of the eye is exposed, a part extending into the larger bearing and connected by screw threads to one of said elements and journaled or pivotally mounted on the other of said elements, and a nut or its equivalent threading on the bolt element against the yoke arm formed with the larger bearing.

I have here illustrated this joint as associated with the semi-elliptical springs of a full elliptical spring construction, one being formed with an eye 1 and the other with a yoke element, the arms 2, 3 of which lap opposite ends of the eye 1. 4 designates the spring bolt extending through bearings 5, 6 of the yoke arms 2, 3 and through the bore of the eye 1 which is alined with the bearings 5, 6. Preferably, a bushing 7 surrounds the bolt within the eye, and the bolt is formed with a lubricant reservoir 8 from which oil or other lubricant is supplied to the bearing or eye through ducts 10 and a peripheral groove 11 in the bolt. A suitable wick 12 may also be used to facilitate transfer of the lubricant from the reservoir to the outside of the bolt. However, the lubricating feature forms no part of this invention. The bearing 5 of the yoke arm 2 substantially fits the bolt adjacent the head 13 thereof and the bearing 6 is of considerably greater diameter than the bolt in order to form an annular hole 14 around the bolt through which the end of the eye 1 is exposed, this bearing being however, of less diameter than the external diameter of the eye. The means or part for taking up wear between the ends of the eye 1 and yoke arms 2, 3 extends into the bearing 6 of the yoke element and surrounds the bolt element it being connected by screw threads to one of said elements and journaled on the other. Preferably, said part is a round nut 16 threading on the bolt against one end of the eye 1 and journaled or pivotally mounted in the bearing opening 6 of the yoke arm 3. Said nut is here illustrated as provided with radial slots 17 in its outer side for receiving a suitable tool to turn the nut, and for receiving the tongue 18 of a lock washer 19 mounted on the bolt, and having a tongue 20 slidable in a keyway 20$^a$ in the threaded end of the bolt. 21 is the usual nut threading on the bolt against the outer face of the yoke arm 3 or the lock washer 19, which has one or more tongues 22 bendable against the hexagonal faces of the nut in the usual manner.

In use, to take up wear at the ends of the eye, the nut 21 and lock washer 19 are removed, and the nut 16 turned. The lock washer and nut 21 then are again replaced.

This construction of joint is particularly simple, economical, compact in construction and readily adjustable to take up wear.

What I claim is:

1. A joint for vehicle springs comprising a member formed with an eye, and an element formed with a yoke, the arms of which embrace the eye and lap the ends thereof, said yoke arms being formed with bearings alined with the eye, and a bolt element extending through the bearings and the eye, one bearing substantially fitting the bolt element adjacent the head thereof and the other being of greater diameter than the bolt, a thrust member mounted in the larger bearing and on the bolt, and thrusting against the contiguous end of the eye, and a nut threading on the bolt element against the outer face of the yoke arm formed with the larger bearing, the thrust member being mounted to be adjustable axially of the bolt element and the bearing independently of the nut, substantially as and for the purpose described.

2. A joint for vehicle springs comprising a member formed with an eye, and an element formed with a yoke, the arms of which embrace the eye and lap the ends thereof, said yoke arms being formed with bearings alined with the eye, and a bolt element extending through the bearings and the eye, one bearing substantially fitting the bolt element adjacent the head thereof and the other being of greater diameter than the bolt, a part extending into the larger bearing and thrusting against the contiguous end of the eye, said part being connected to one of said elements by screw heads and journaled relatively to the other element, and a nut threading on the bolt against the yoke arm formed with the larger bearing, substantially as and for the purpose specified.

3. A joint for vehicle springs comprising a member formed with an eye and an element formed with a yoke, the arms of which embrace the eye, the yoke arms being formed with bearings alined with opposite ends of the eye, a bolt element extending through the alined bearings and the eye, one of said bearings substantially fitting the bolt element adjacent the head thereof and the other being of greater diameter than the threaded end of the bolt, a nut threading on the bolt element and journaled in the latter bearing and also thrusting against one end of the eye, and a nut threading on the bolt against the outer face of the yoke arm provided with the larger bearing, substantially as and for the purpose set forth.

In testimony whereof, I have hereunto signed my name at Syracuse, in the county of Onondaga, and State of New York, this 18th day of August, 1920.

LOUIS M. STELLMANN.